United States Patent Office 3,839,431
Patented Oct. 1, 1974

---

3,839,431
CYCLOPROPYLMETHYLPHENYLACETIC ACIDS AND DERIVATIVES
John T. Sheehan, Middlesex, Patrick A. Diassi, Westfield, Seymour D. Levine, North Brunswick, and George C. Rovnyak, Hopewell, N.J., assignors to E. R. Squibb & Sons, Inc., New York, N.Y.
No Drawing. Continuation-in-part of abandoned application Ser. No. 54,598, July 13, 1970. This application June 8, 1971, Ser. No. 150,928
Int. Cl. C07c 65/20
U.S. Cl. 260—515 R    5 Claims

ABSTRACT OF THE DISCLOSURE p-Cyclopropylmethylphenylacetic acids and esters thereof, amides, aldehydes, alcohols and esters thereof, ethers and non-toxic salts as well as p-cyclopropylcarbonyl phenylacetic acids and their derivatives are provided which are useful as anti-inflammatory agents. In addition, methods for preparing these acetic acid derivatives are provided.

---

This application is a continuation-in-part of application Ser. No. 54,598, filed July 13, 1970, now abandoned.

This invention relates to new p-cyclopropylmethyl phenyl acetic acids and derivatives thereof of the formula

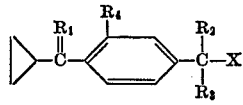

wherein

represents

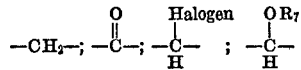

wherein $R_7$ is hydrogen, lower alkyl,

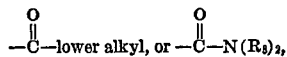

$R_8$ can be hydrogen or lower alkyl;

wherein $R_8$ is as defined above; or

wherein $R_5$ and $R_6$ can be the same or different and represent hydrogen, lower alkyl,

wherein $R_9$ is lower alkyl, $-N(R_8)_2$ or lower alkoxy, and

can be taken together to form a heterocyclic radical; $R_2$ and $R_3$ can be the same or different and represent hydrogen; lower alkyl; monocyclic aryl-lower alkyl; monocyclic cycloalkyl; or taken together can be alkylidene; monocyclic aryl-alkylidene such as

$R_4$ can be hydrogen, hydroxy, lower alkyl, lower alkoxy, lower alkanoyloxy, halogen or trifluoromethyl; X can be $-CN$; $-CH_2OR_{10}$ wherein $R_{10}$ is hydrogen, acyl, lower alkyl or formamido;

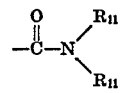

wherein each $R_{11}$ can be the same or different and can be hydrogen, lower alkyl, formamido,

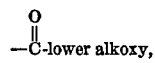

$-CH_2COOH$, or lower alkyl amino lower alkyl or taken together can be amino;

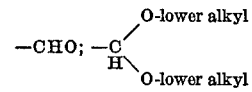

$-CH_2Hal$; halogen; $-COOH$ or $COOR_{12}$ wherein $R_{12}$ can be lower alkyl, monocyclic aryl, monocyclic aryl-lower alkyl, or an alkali metal such as sodium or potassium, or an alkaline earth metal such as calcium or magnesium.

The term "lower alkyl" as employed herein includes both straight and branched chain radicals of up to and including eight carbon atoms, for instance, methyl, ethyl, propyl, isopropyl, butyl, s-butyl, t-butyl, isobutyl, pentyl, hexyl, isohexyl, heptyl, 4,4-dimethylpentyl, octyl, 2,24-trimethylpentyl and the like.

The halogen can be Br or Cl, except in $-CH_2$Halogen wherein Br, Cl and I are included.

The term "lower alkoxy" includes straight and branched chain radicals of the structure RO— wherein R includes any of the above lower alkyl groups.

The "lower alkanoyl" group has the structure

wherein R includes any of the above alkyl groups.

The "amino" groups may include unsubstituted amino or mono- or di-lower alkyl amino groups, wherein lower alkyl is as defined above, such as amino, methylamino, ethylamino, isopropylamino, heptylamino, dimethylamino, diethylamino, methylethylamino, methylbutylamino, ethyl-i-propylamino and the like.

The term "monocyclic aryl" as employed herein includes monocyclic carbocyclic aryl radicals, for instance, phenyl and substituted phenyl radicals, including lower alkyl phenyl, such as tolyl, ethylphenyl, butylphenyl and the like, di(lower alkyl)phenyl (e.g., dimethylphenyl, 3,5-diethylphenyl and the like), halophenyl (e.g., chlorophenyl, bromophenyl, and 2,4,5-trichlorophenyl) and nitrophenyl.

The term "monocyclic cycloalkyl" includes cyclic radicals containing from 3 to 6 ring members (e.g., cyclopropyl, cyclobutyl, cyclopentyl and cyclohexyl).

As indicated hereinbefore

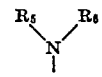

may form a heterocyclic radical. The symbols $R_5$ and $R_6$ may together represent the carbon (and hydrogen) and the oxygen, sulfur or nitrogen atoms which, with the nitrogen atom in the above group, form a 5- or 6-membered nitrogen heterocyclic containing not more than one hetero atom in addition to the nitrogen already shown in the group and less than 21 atoms in the radical (excluding hydrogen). The heterocyclic radicals may include one to three substituents including lower alkoxy or lower alkyl as defined hereinbefore; lower alkanoyl groups as defined hereinbefore, such as acetyl, propionyl and the like; hydroxy-lower alkyl, such as hydroxymethyl, 2-hydroxyethyl, or the like; hydroxy-lower alkoxy-lower alkyl, such as 2-(2-hydroxyethoxy)ethyl, or the like; lower alkanoyloxy-lower alkyl, such as 2-heptanoyloxyethyl; carbo-lower alkoxy, such as carbomethoxy, carboethoxy, carbopropoxy, or the like; or 2-(lower alkanoyloxy-lower alkoxy)-lower alkyl, such as 2-(decanoyloxyethoxy)ethyl, or the like.

Illustrative of the heterocyclic radicals represented by

are the following: piperidino; (lower alkyl)piperidino [e.g., 2-, 3-, or 4-(lower alkyl)piperidino or 4-(lower alkyl)piperidino, such as 2-ethyl piperidino or 4-isopropylpiperidino]; di(lower alkyl)piperidino [e.g., 2,4-, 2,5- or 3,5-di(lower alkyl)piperidino, such as 2,4-dimethyl piperidino or 2,5-di-t-butyl piperidino]; (lower alkoxy) piperidino [e.g., 2-methoxypiperidino or 3-methoxypiperidino]; hydroxypiperidino [e.g., 3-hydroxy- or 4-hydroxypiperidino]; aminomethylpiperidino [e.g., 4-aminomethylpiperidino]; pyrrolidino; (lower alkyl)pyrrolidino [e.g., 3-methylpyrrolidino]; di(lower alkyl)pyrrolidino [e.g., 3,4 - dimethylpyrrolidino]; (lower alkoxy)pyrrolidino [e.g., 2-methoxypyrrolidino]; morpholino; (lower alkyl) morpholino [e.g., 3-methylmorpholino]; di(lower alkyl) morpholino [e.g., 3,5-dimethylmorpholino]; (lower alkoxy)morpholino [e.g., 2-methoxymorpholino]; thiamorpholino; (lower alkyl)thiamorpholino [e.g., 3-methylthiamorpholino]; di(lower alkyl)thiamorpholino [e.g., 3,5-dimethylthiamorpholino; (lower alkoxy)thiamorpholino [e.g., 3-methoxythiamorpholino]; piperazino; (lower alkyl)piperazino [e.g., N4-methylpiperazino]; di(lower alkyl)piperazino [e.g., 2,5-dimethylpiperazino or 2,6-dimethylpiperazino]; (lower alkoxy)piperazino [e.g., 2-methoxypiperazino]; (hydroxy-lower alkyl)piperazino [e.g., N4-(2 - hydroxyethyl)piperazino]; (lower alkanoyloxy-lower alkyl)piperazino [e.g., N4-(2-heptanoyloxyethyl) piperazino or N4-(2-propionyloxyethyl)piperazino]; (hydroxy-lower alkoxy-lower alkyl)piperazino [e.g., (hydroxy-methoxy-methyl)piperazino]; (carbo-lower alkoxy) piperazino [e.g., N4-(carbomethoxy-, carboethoxy-, or carbopropoxy)piperazino].

Examples of substituted p-cyclopropylmethylphenylacetic acids falling within the present invention include, but are not limited to, the following:

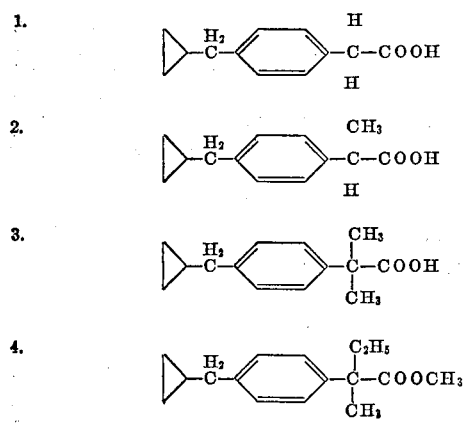

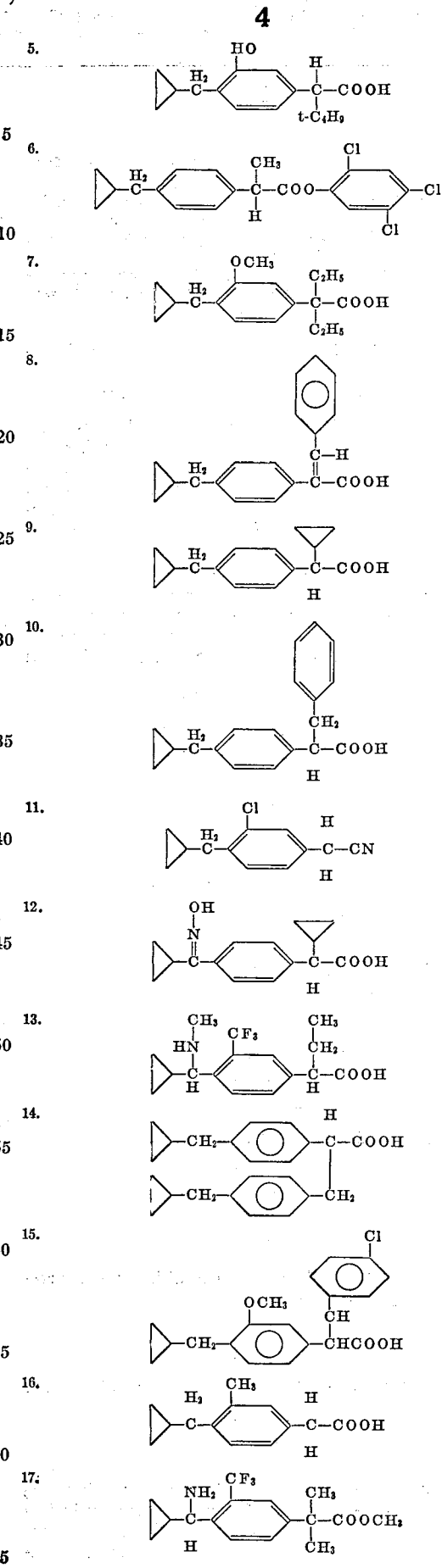

18. 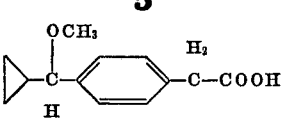

19. 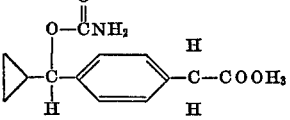

20. 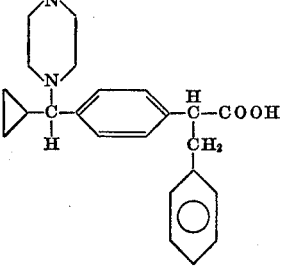

21. 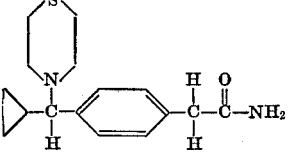

22. 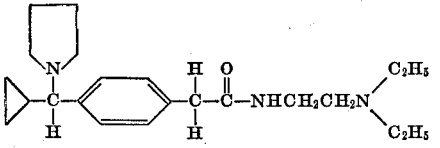

23. 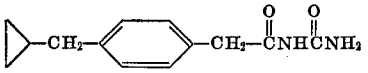

24. 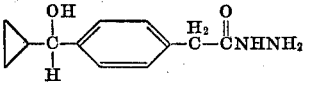

25. 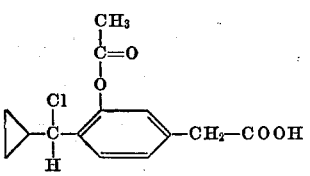

26. 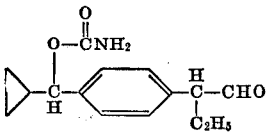

27. 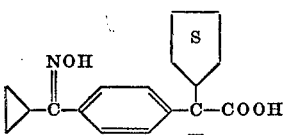

28. 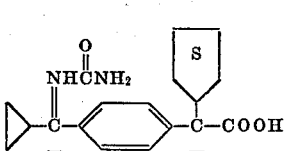

29. 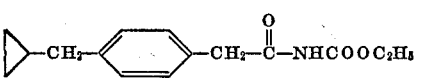

To prepare compounds of the instant invention, a cyclopropyl phenyl ketone of the formula II 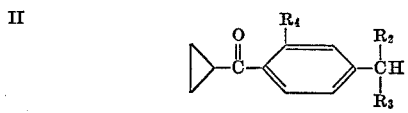

wherein $R_2$, $R_3$ and $R_4$ are as previously described, is brominated or chlorinated, as for example, with molecular bromine or chlorine, or an N-(bromo or chloro)-amide, e.g., N-(bromo or chloro)-acetamide or N-(bromo or chloro)-succinimide, in an inert solvent such as carbon tetrachloride, benzene, or petroleum ether, under illumination, preferably under ultraviolet light, to form a p-cyclopropylcarbonyl bromide or chloride of the formula III 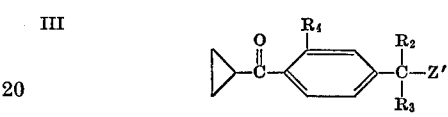

wherein Z' is Br or Cl.

The above product of formula III can then be reacted with a cyanide such as hydrogen cyanide or an alkali metal cyanide, e.g., sodium cyanide or potassium cyanide, preferably in the presence of a suitable solvent such as any of those previously mentioned, or aqueous alcohol or an aprotic solvent such as dimethyl formamide or dimethyl sulfoxide to form a p-cyclopropylcarbonyl-phenylacetonitrile of the formula IV 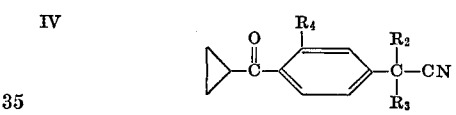

The ketonic function of the structure of formula IV can then be reduced as by reaction with hydrazine and alkali, such as an alkali metal hydroxide, at elevated temperatures within the range from about 100° C. to 200° C., or diborane to form a p-cyclopropylmethylphenylacetonitrile of the formula V 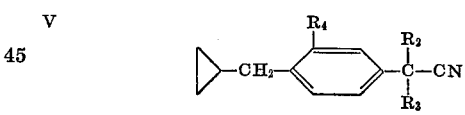

The nitriles of formulae IV and V can then be hydrolyzed to form the p-cyclopropylcarbonyl or methyl-phenyl acetic acid of the formula VI 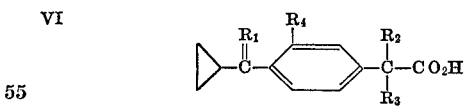

wherein

is keto or methylene. The hydrolysis is effected by conventional means as for example, by treating the nitrile with alkali in aqueous alcohol. Alternatively, the keto-nitrile of formula IV can first be hydrolyzed to the acid of formula VI wherein

is keto, and then reduced to form the acid of formula VI wherein

is methylene.

The acid of formula VI can then be esterified to form esters of the formula

VII  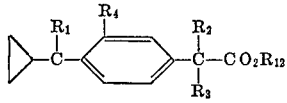

wherein

is keto or methylene and $R_{12}$ is lower alkyl, aryl or aryl-lower alkyl. The esterification is preferably effected by reacting the acid with a lower alkyl, aryl or aryl-lower alkyl alcohol in the presence of a dehydrating catalyst. Alternatively, the ester can be formed by other conventional methods such as formation of the acid halide of the acid by reaction with a halogenating agent such as thionyl chloride or bromide or oxalyl chloride and reaction with an alkali or alkaline earth metal salt of the alcohol, or formation of the alkali or alkaline earth metal salt of the acid and reaction with the appropriate lower alkyl, aryl or aryl lower alkyl halide. The alkali and alkaline earth metal salts of the acid of formula VI are prepared by reacting said acid with the appropriate alkali or alkaline earth metal hydroxide.

An alternative procedure for preparing the cyclopropyl-carbonyl or methyl-phenyl acetic acids of formula VI involves reacting a γ-halo butyryl halide (preferably Cl or Br), e.g., γ-chloro butyryl chloride of the formula VIII  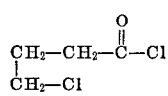

with a phenyl acetic acid ester of the formula

IX  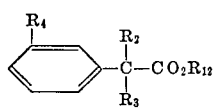

wherein $R_2$, $R_3$, $R_4$ and $R_{12}$ are as previously described, in the presence of at least a molar equivalent of anhydrous aluminum chloride, in a Friedel-Crafts acylation to form a p-(γ-halobutyryl)phenyl acetic acid of the formula X  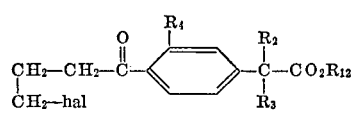

The propyl chain in the compound X is then cyclized by reaction with a base such as sodium methoxide, sodium hydride or sodium hydroxide, in an organic solvent such as methanol to obtain the ester of formula VI wherein

is keto having the formula

XI  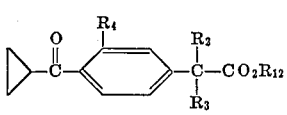

The cyclopropylmethyl derivative

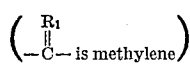

can then be prepared by reduction with hydrazine and alkali as previously described and the corresponding acids can be prepared from the esters by saponification.

The starting materials of formula II can be prepared utilizing the same reactions by reacting the γ-halo-butyryl halide with a compound of the formula XIa  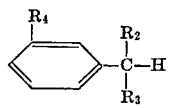

wherein $R_2$, $R_3$ and $R_4$ are as previously defined to form the γ-halo-butyrophenone of the formula XIb  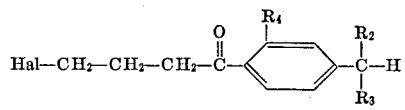

and cyclizing as above to prepare the cyclopropylphenyl ketone of formula II.

The acid of formula VI or ester of formula VII can then be reduced to the alcohol of the formula XII  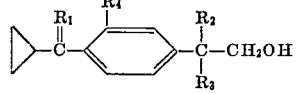

wherein

is keto or mthylene by reduction with an appropriate reducing agent such as lithium aluminum hydride in an inert solvent such as ether. Since the reducing agent preferentially reacts first at the acid or ester site, the ketonic function of an acid or ester wherein

is keto is retained by limiting the amount of reducing agent used, i.e., by reaction with 0.25 molar equivalent or less of lithium aluminum hydride. Alternatively, the keto function can first be protected as by ketalization, e.g., reaction with ethylene glycol, followed by reduction and subsequent removal of the ketal protecting group by hydrolysis.

The foregoing procedures result in preparation of compounds of the formula I, i.e.,

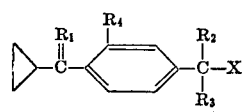

wherein X is Br, Cl, CN, $CO_2H$, $CH_2OH$ and $CO_2R_{12}$ where $R_{12}$ is lower alkyl, aryl and aryl lower alkyl; and

is keto when X is Br or Cl and keto or methylene when X is CN, $CO_2H$, $CH_2OH$ or $CO_2R_{12}$.

The remaining products of formula I can be prepared by further reaction of the keto group

or the carboxylic acid or ester group or the alcohol group.
Compounds of formula I wherein

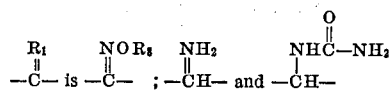

can be prepared as follows:
A phenyl acetic acid of the structure

XIII  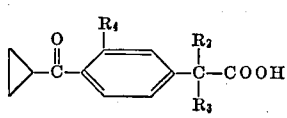

is reacted with a hydroxylamine of the formula $H_2NOR_8$ wherein $R_8$ is hydrogen or lower alkyl or its hydrohalide, such as hydroxylamine hydrochloride, in a molar ratio of acid to amino compound of within the range from about 1 to about 2 and preferably from about 1 to about 1.1, in the presence of a base such as pyridine and an alcohol such as methanol or ethanol to form the oxime of the structure

XIV

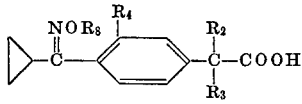

Hydrogenation of the oxime in absolute alcohol containing dry hydrogen chloride is carried out in the presence of a reducing agent, such as hydrogen and a catalyst, such as palladium on charcoal, to form a phenylacetic acid of the structure:

XV

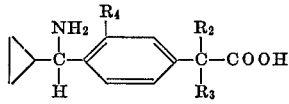

The amino compound of structure XV can be converted to the corresponding ureido derivative having the structure XVa

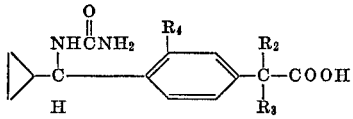

by reacting the amino compound XV or a salt thereof with an alkali metal cyanate such as potassium cyanate.

Compounds of formula I wherein

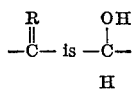

can be prepared by treating a p-cyclopropylcarbonylphenylacetic acid of the structure:

XVI

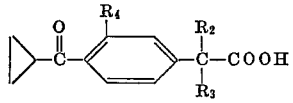

with a reducing agent, such as sodium borohydride.

Compounds of formula I wherein

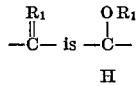

($R_1$=lower alkyl) are prepared by treating the corresponding alcohol with a base, for example sodium hydride, in an inert solvent, such as dimethylformamide, followed by addition of an alkyl halide. The alkoxy acid is obtained by saponification of the ester.

Compounds of formula I wherein

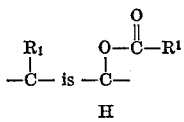

($R^1$=lower alkyl) are prepared by reacting the benzyl ester of ($\alpha$ - cyclopropyl-$\alpha$-hydroxy-p-tolyl)-acetic acid with the appropriate acyl halide in pyridine, followed by catalytic hydrogenolysis of the benzyl group.

Compounds of formula 1 wherein

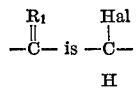

can be prepared by treating an ($\alpha$-cyclopropyl-$\alpha$-hydroxy-p-tolyl)acetic acid (prepared as described above) having the structure

XVII

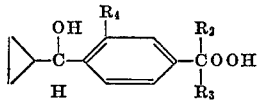

with mesyl chloride in a solution with an organic base such as pyridine, and treating the sulfonate thus formed with an alkali metal halide, such as lithium chloride or bromide.

Compounds of formula I wherein $R_5$ and/or $R_6$ are lower alkyl, or taken together form a heterocyclic can be formed by reacting an ($\alpha$ - cyclopropyl-$\alpha$-halo-p-tolyl) acetic acid with the desired alkyl amine or heterocyclic amine, such as, for example, with morpholine or diethylamine.

Compounds of formula I wherein

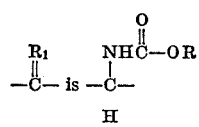

wherein R is lower alkyl can be formed by treating a basic solution of an ($\alpha$ - amino-$\alpha$-cyclopropyl-p-tolyl) acetic acid with an alkyl chloroformate, such as methyl chloroformate.

Compounds of formula I wherein

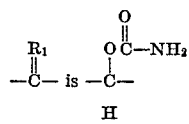

can be prepared by treating an ($\alpha$ - cyclopropyl - $\alpha$-hydroxy-p-tolyl)-acetic acid benzyl ester in a basic solvent, such as pyridine, with phenylchloroformate, followed by hydrogenation, and treatment with ammonia to form the carbamate.

Compounds of formula I wherein

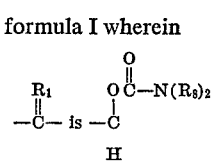

are prepared by reacting the benzyl ester of ($\alpha$-cyclopropyl-$\alpha$-hydroxy-p-tolyl)acetic acid with phenylchloroformate in a basic solvent, such as pyridine, catalytic hydrogenolysis of the benzyl group and treatment with an appropriate amine $[NH(R_8)_2]$.

Compounds of formula I wherein

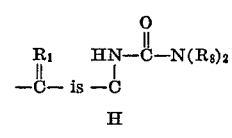

are prepared by reacting the benzyl ester of ($\alpha$-amino-$\alpha$-cyclopropyl-p-tolyl)acetic acid with the appropriate carbamoyl halide, for example dimethyl carbamoyl chloride, in a basic solvent such as pyridine, followed by hydrogenolysis of the benzyl group.

Compounds of the formula I wherein

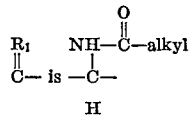

are prepared by reacting the benzyl ester of ($\alpha$-amino-$\alpha$-cyclopropyl-p-tolyl)acetic acid with an acyl halide, for example propionyl chloride, in a basic solvent such as pyridine, followed by hydrogenolysis of the benzyl group.

Compounds of formula I wherein X is carbinol can be converted to the alkali or alkaline earth metal salts by reacting the corresponding alcohol with an alkali or alkaline earth metal hydroxide such as sodium hydroxide.

The acyloxy or alkoxy derivative of the alcohol (X is $CH_2OR_{10}$; $R_{10}$ is acyl or lower alkyl) can be prepared from the salt by reaction with the desired $R_{10}$-halide.

The carbamate

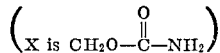

is prepared by reacting the corresponding alcohol (X is —$CH_2OH$) with a chloroformate, e.g., phenylchloroformate, followed by treatment with ammonia gas.

Compounds of the formula I wherein X is —$CH_2$-halogen, wherein halogen is Cl, Br or I can be prepared from the corresponding alcohol by conventional techniques such as by reacting the alcohol with toluenesulfonyl chloride and treating the reaction product with the desired metal halide.

Compounds wherein X is

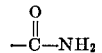

can be prepared from a phenylacetic acid ester of the formula

XVIII 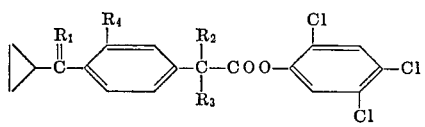

wherein

is keto or methylene, by treatment with ammonia.

Compounds wherein one or both of $R_{11}$ is lower alkyl or lower alkyl amino lower alkyl are prepared by reacting a reactive derivative of the corresponding acid (X is $CO_2H$), for example, the acid halide or the mixed anhydride thereof, with an appropriate lower alkyl amine or lower alkyl amino alkyl amine as for example, diethylamine, or diethylaminoethylamine.

Compounds wherein X is

are prepared by treating the corresponding 2,4,5-trichlorophenyl ester with a solution of glycine in water, dioxane and a base; such as sodium hydroxide while maintaining the pH at about 10.

Compounds wherein $R_{11}$ is amino, or alkyl-substituted amino (X is

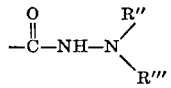

and R″ and R‴ being H or lower alkyl) can be prepared by reacting the corresponding ($\alpha$-cyclopropyl - p - tolyl) acetic acid ester with hydrazine or an alkyl substituted hydrazine in a solvent such as methanol.

Urea derivatives of formula I

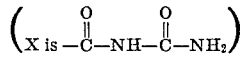

can be prepared by treating a reactive derivative of I (X=$CO_2H$), for example the acid halide, with silver isocyanate, followed by addition to ammonium carbonate.

Compounds wherein X is

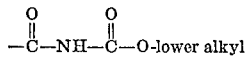

can be prepared by reacting a reactive derivative of I (X=$CO_2H$), for example the acid halide, with silver isocyanate, followed by reaction with the appropriate alcohol.

Compounds wherein X is aldehydo (—CH=O) are prepared by treating the corresponding acid halide (formed for example, by reacting the corresponding acid with oxalyl chloride) with ethyleneimine to form the N-acyl-aziridine followed by reaction with lithium aluminum hydride. The di-lower alkyl acetal thereof can be prepared by reacting the aldehyde with the appropriate lower alkyl alcohol, preferably in the presence of a catalyst such as p-toluenesulfonic acid.

The foregoing procedures result in compounds wherein the groups $R_2$ and $R_3$ can be the same or different and represent hydrogen, lower alkyl, monocyclic aryl-lower alkyl, monocyclic cycloalkyl, or taken together can be alkylidene or monocyclic aryl-alkylidene. It is sometimes desirable to prepare a product wherein either $R_2$ or $R_3$ or both are hydrogen and to substitute therefor, at a later stage in the process one or two hydrocarbon radicals of the group above included in the definition of $R_2$ and $R_3$.

This substitution can be conveniently effected at the ester stage of the process by reacting an ester of the formula XIX 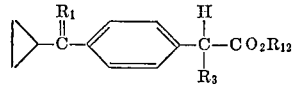

wherein $R_3$, $R_{12}$ and $R_4$ are as previously described and

is keto or methylene with sodium hydride or sodium amide, thereby substituting a sodium atom for the alpha-hydrogen atom, and then reacting with a halide of the formula $R'_2Z$ wherein $R'_2$ is a hydrocarbon radical of the group previously defined in the definition of $R_2$ and Z is chlorine, bromine or iodine.

Where $R_3$ in the above ester is hydrogen and it is desired to also substitute this position with a hydrocarbon radical as previously defined, i.e., $R'_2$, the ester can be reacted with two equivalents of sodium hydride or amide to form the $\alpha,\alpha$-di sodium substituted intermediate, which on reaction with two equivalents of $R'_2Z$ results in an $\alpha,\alpha$-di R′ substituted product wherein both $R'_2$ groups are the same.

Alternatively, where $R_3$ of the starting ester is hydrogen and it is desired to prepare a product wherein the $\alpha,\alpha$-di $R'_2$ substituted hydrocarbon radicals are different, one would effect the reaction in two stages first forming a mono-alpha-sodium substituted intermediate and inserting the desired $R'_2$ group, and then again reacting the product with sodium hydride or amide and inserting a second different $R'_2$ group. The reaction is effected in an inert solvent such as benzene or 1,2-dimethoxyethane or in liquid ammonia.

The substituted phenylacetic acids of formula I form salts with organic bases, e.g., alkylamines such as methylamine, ethylamine, isopropylamine, glucamine, dimethylamine, etc., heterocyclic amines such as piperidine, morpholine, and the like, and with inorganic bases, e.g., ammonium hydroxide, alkali metal hydroxides such as sodium hydroxide, potassium hydroxide, etc., alkaline earth metal hydroxides such as calcium hydroxide, magnesium hydroxide, etc., alkali metal carbonates and bicarbonates such as sodium carbonate, potassium bicarbonate, etc. These basic salts may be used in the preparation and/or isolation of the products of this invention. When the product is produced in the form of the basic salt, neutralization with an acid, e.g., a mineral acid such as hydrochloric acid, or organic acid such as citric acid, will yield the compound in the acid form. Other basic salts may then be formed by reaction with the appropriate organic or inorganic base.

The compounds of this invention as illustrated by structure I are useful as anti-inflammatory agents and are effective in the prevention and inhibition of granuloma tissue formation in warm blooded animals, for example, in a manner similar to indomethacin. They may be used to decrease joint swelling, tenderness, pain and stiffness, in mammalian species, e.g., in conditions such as rheumatoid arthritis. A compound of formula I or a physiologically acceptable salt of the character described above may be compounded according to accepted pharmaceutical practice in oral dosage forms such as tablets, capsules, elixirs or powders for administration of about 100 mg. to 2 gm. per day, preferably 100 mg. to 1 gm. per day, in two to four divided doses. For example, about 150 mg./kg./day is effective in reducing paw swelling in rats.

The compounds of the invention can also be employed as sun-screening agents. Furthermore, the phenylacetic acids of the invention can be employed as intermediates in the preparation of substituted penicillin derivatives.

The following examples are illustrative. Temperatures are on the centigrade scale.

EXAMPLE 1 p-Cyclopropylcarbonylbenzylbromide

To a solution of 16 g. (0.1 m.) of p-tolylcyclopropyl ketone in 200 ml. of carbon tetrachloride, 17.8 g. (0.1 m.) of N-bromosuccinimide is added and the mixture heated to reflux temperature. While heating and stirring, the suspension is irradiated for one hour when most of the reagents dissolve and the solution becomes almost colorless. The mixture is then cooled to 0° C. and the insoluble succinimide which separates is filtered off and washed twice with a small volume of cold carbon tetrachloride. The combined filtrate and washings are washed with cold normal sodium hydroxide solution, then with water and dried over anhydrous calcium chloride. After the removal of the desiccant, the solvent is evaporated in vacuo and the residue which is obtained solidifies. It crystallizes from hexane, m.p. 69–71°.

EXAMPLE 2 p-Cyclopropylcarbonyl phenylacetonitrile

A solution of 4.8 g. (0.02 m.) of p-cyclopropylcarbonylbenzylbromide in alcohol, is added dropwise to a refluxing solution of 3 g. of potassium cyanide in 25 ml. of 80% ethanol. After the addition, the mixture is heated under reflux for two hours. The alcohol is then removed by evaporation and the residue dissolved in water. The dark aqueous solution is extracted with five 25 ml. portions of ether and the combined ether extract washed successively with 10% potassium bicarbonate solution and then with water. After drying over calcium chloride, the solvent is evaporated and the solid residue extracted with boiling hexane. From the hexane solution, on cooling, the product is obtained, m.p. 85–87°. It can be recrystallized from alcohol.

EXAMPLE 3 p-Cyclopropylcarbonylphenylacetic acid

To 8 ml. of a mixture of 4 g. solid potassium hydroxide (85%), 4 ml. of water and 20 ml. of ethanol, 1.0 g. of p-cyclopropylcarbonylphenylacetonitrile is added and the mixture heated under reflux with stirring in a nitrogen atmosphere for three hours. The alcohol is then removed by evaporation in vacuo. The residue is dissolved in water and then extracted with ether. The aqueous solution is treated with a small amount of charcoal and filtered. The filtrate is acidified with citric acid and the insoluble product is filtered and washed with water. It crystallizes from hexane, m.p. 110–113°.

EXAMPLE 4 p-Cyclopropylmethylphenylacetic acid

The above keto acid from Example 3 (205 mg., 1 mmole), 2.4 mmole of 85% hydrazine hydrate and 2.4 mmole of 85% potassium hydroxide dissolved in 2 ml. of diethylene glycol are heated in a nitrogen atmosphere, while stirring, in an oil-bath at 120° for one hour. The condenser is then set for distillation and the temperature is gradually raised to 200°. After one and one-half hours at 200°, the reaction mixture is cooled to room temperature and diluted with water. The aqueous solution is clarified with a little charcoal and the filtrate acidified with 1N hydrochloric acid. The insoluble product is filtered and washed with water. It sublimes under vacuum at 70–80°, m.p. 85–86°.

EXAMPLE 5

(α-Cyclopropyl-α-hydroxy-p-tolyl)acetic acid

A mixture of 10 g. of p-cyclopropylcarbonylphenylacetic acid, 26.7 g. of sodium borohydride, 500 ml. of tetrahydrofuran, 65 ml. of 5% sodium hydroxide solution and 65 ml. of water is refluxed for 20 hours. Additional water is added and the solution is refluxed for 0.5 hour. The tetrahydrofuran is removed in vacuo and the aqueous mixture is extracted with chloroform. The aqueous mixture is then acidified with 1N HCl and extracted twice with 100 ml. of chloroform. The extracts are combined and dried over anhydrous calcium chloride. Removal of the desiccant and concentration in vacuo gives a viscous residue which can be crystallized from alcohol to give the hydroxyacid.

EXAMPLE 6

(α-Cyclopropyl-α-methoxy-p-tolyl)acetic acid

A mixture of 5.2 g. (0.025 m.) of (α-cyclopropyl-α-hydroxy-p-tolyl)acetic acid and 2 g. (0.05 m.) of sodium hydroxide in 20 ml. of water is cooled with stirring in an ice-salt bath to below 10°. There is then added with stirring 3.2 g. (2.5 ml., 0.025 m.) of dimethyl sulfate. This addition requires about one hour and the cooling bath is not removed until the addition is complete. The mixture is then heated on a steam bath for four hours. The mixture is cooled and extracted with two 25 ml. portions of benzene. The combined benzene extract is washed twice with 10 ml. of water and dried over calcium chloride. The solvent is removed by distillation and the residue, the methoxy, methyl ester of the starting material, is added to a hot solution of 2.2 g. of potassium hydroxide in 10 ml. of water. The mixture is heated to reflux for three hours when a clear homogeneous solution is obtained. On cooling the mixture is carefully acidified to Congo red (pH 3) using citric acid and the free acid obtained. It is crystallized from ethanol.

EXAMPLE 7

(α-Cyclopropyl-α-hydroxy-p-tolyl)acetic acid carbamate ester

A solution of (α-cyclopropyl-α-hydroxy-p-tolyl)acetic acid (4.14 g., 20 mmoles) in ether is added to 3-benzyl-1-p-tolyl-triazene and the solution kept at 25° until nitrogen evolution ceases (ca. 12 hours). The solution is washed with dilute acid and dilute base, dried and then evaporated to yield benzyl(α-cyclopropyl-α-hydroxy-p-tolyl) acetate. This ester is dissolved in 10 ml. of dry pyridine and while cooling and stirring 3.5 g. (20 mm.) of phenylchloroformate is slowly added. The reaction mixture is stirred for three hours at room temperature and then decomposed by addition of 25 ml. of cold water. This mixture is extracted several times with ether and the combined ether extracts are washed successively with 40 ml. of 1:1 hydrochloric acid (in two equal portions), 40 ml. of water (in two portions) and saturated sodium chloride solution. The extract is then dried with magnesium sulfate and the solvent evaporated.

The residue is dissolved in 50 ml. of ethyl acetate and the benzyl group hydrogenolyzed using 0.5 g. of 5% palladium on charcoal catalyst with hydrogen at atmospheric pressure. The catalyst is filtered off, washed with ethyl acetate and the solvent removed in vacuo. The residue is dissolved in 40 ml. of dry ether.

This ether solution of the mixed carbonate is added with stirring to an equal volume of liquid ammonia. The mixture is stirred at the reflux temperature (Dry-Ice condenser) for 6–8 hours and then left to evaporate overnight. Ether and water are added and after carefully acidifying the aqueous layer the ether layer is separated and washed successively with 40 ml. of water (in two portions) and 20 ml. of saturated sodium chloride solution. The dried ether solution is concentrated to a small volume and the carbamate is crystallized by the addition of petroleum ether. The carbamate is purified by recrystallization from isopropyl ether and alcohol.

EXAMPLE 8

(α-Cyclopropyl-α-acetoxy-p-tolyl)acetic acid

In a flask set for distillation are placed 15 g. (0.07 mol) of (α-cyclopropyl - α - hydroxy - p - tolyl)acetic acid and 15 g. (14 ml., 0.19 mol) of acetyl chloride. A reaction sets in without the application of heat. As soon as a clear solution results, the flask is warmed on the steam bath and the excess acetyl chloride removed by evaporation. Traces of acetyl chloride are removed in vacuum and the acetylated acid crystallizes on standing. It is purified by recrystallization from ethanol.

EXAMPLE 9

(α-Cyclopropyl-α-bromo-p-tolyl)acetic acid

A mixture of 60 ml. of dimethylformamide, 25 g. of triethylamine and 20 g. of (α-cyclopropyl-α-hydroxy-p-tolyl)-acetic acid is treated with 15 g. of mesyl chloride added in small portions with stirring over a half-hour period. The mixture is then heated on the steam bath for six hours, cooled and diluted with 200 ml. of water and acidified. The product is filtered off, washed with water and dried. It is crystallized from hot water. When heated in dry methylethyl ketone with lithium bromide with the exclusion of moisture, the mesyl compound affords the colorless syrupy (α-cyclopropyl - α - bromo-p-tolyl)acetic acid.

EXAMPLE 10 p-Cyclopropylcarbonylphenylacetic acid, oxime

The oxime of p-cyclopropylcarbonylphenylacetic acid is prepared by heating equal quantities of hydroxylamine hydrochloride and the acid in pyridine and alcohol (1:1) overnight on the steam bath. The solvents are removed under reduced pressure and the residue treated with ice water and the oxime separates.

EXAMPLE 11 p-Cyclopropylcarbonylphenylacetic acid, methoxime

Substituting methoxylamine in place of hydroxylamine in the foregoing Example 10, but employing the same conditions, the methoxime of p-cyclopropylcarbonylphenylacetic acid is obtained.

EXAMPLE 12

(α-Amino-α-cyclopropyl-p-tolyl)acetic acid

The oxime of p-cyclopropylcarbonylphenylacetic acid (22 g., 0.1 mole) is dissolved in 200 ml. absolute alcohol containing 0.25 mole of dry hydrogen chloride. Hydrogenation is carried out with 2.0 g. of 5% palladium on charcoal at a pressure of about 30 lbs., at room temperature. The mixture is filtered to remove the catalyst and the filtrate concentrated to a small volume and then diluted with dry ether, and the product separates.

EXAMPLE 13

(α-Cyclopropyl-α-methylamino-p-tolyl)acetic acid

In a pressure bottle are placed 20 g. (0.1 mole) of (α-amino-α-cyclopropyl-p-tolyl)acetic acid and 14 g. (7 ml., 0.1 mole) of methyl iodide in 50 ml. of tetrahydrofuran. The bottle is closed tightly and then allowed to stand for 24 hours in a water bath at 40°. The crystalline mass is broken up and amine liberated by shaking with an equivalent amount of N potassium carbonate solution and ether. The ether solution is washed with water, dried and the solvent evaporated and the N-alkyl amino acid obtained.

EXAMPLE 14

(α-Cyclopropyl-α-ureido-p-tolyl)acetic acid

The hydrochloride of (α-amino-α-cyclopropyl-p-tolyl) acetic acid (as prepared in Example 12) (12 g., 0.05 m.) is dissolved in 40 ml. of water and treated with 4.9 g. (0.06 m.) of potassium cyanate in 20 ml. of water. After several hours, the product is separated by filtration and purified by crystallization from alcohol.

EXAMPLE 15

(α-Acetylamino-α-cyclopropyl-p-tolyl)acetic acid

In a flask with a stirrer are placed 20 g. (0.1 mole) of (α-amino-α-cyclopropyl - p - tolyl)acetic acid and 50 ml. of water. The mixture is stirred vigorously until the acid is almost completely dissolved, when 22 g. (0.2 mole) of 95% acetic anhydride is added in one portion. Vigorous stirring is continued for fifteen to twenty minutes, during which time the solution becomes hot and the product begins to crystallize. The solution is cooled overnight to effect complete crystallization. The precipitate is collected, washed with cold water and dried.

EXAMPLE 16

(α-Carboxyamino-α-cyclopropyl-p-tolyl)acetic acid, N-methyl ester

To a solution of 20.5 g. (0.1 m.) of (α-amino-α-cyclopropyl-p-tolyl)acetic acid in 2N sodium hydroxide solution adjusted to pH 10.2 by pH-stat control, 14.3 g. of methyl chloroformate is added with cooling while stirring. The pH is maintained by automatic control at pH 10–11. After the addition the mixture is stirred for one hour and then carefully adjusted to pH 5, when the product separates. This is filtered, washed with water and crystallized from alcohol.

EXAMPLE 17

(α-Cyclopropyl-α-N-morpholino-p-tolyl)acetic acid

A mixture of 30 ml. of morpholine and 31 g. of (α-cyclopropyl-α-bromo-p-tolyl)acetic acid in 100 ml. dimethylformamide is heated on the steam bath for three hours. The mixture is cooled and diluted with 500 ml. of water and acidified to pH 5.5 and extracted four times with 50 ml. portions of chloroform. The combined chloroform extract is washed with water, dried and then evaporated. The residual oil is crystallized from ethanol.

EXAMPLE 18

2-(α-cyclopropyl-p-tolyl)propionic acid

A solution of 10 g. of methyl (α-cyclopropyl-p-tolyl)-acetate in 100 ml. of 1,2-dimethoxyethane is added to a stirred suspension of 1.1 g. of NaH in 50 ml. of 1,2-dimethoxyethane with cooling to maintain the solution temperature below 30°. To this solution, cooled in an ice/water bath, is added a solution of 6.4 g. of methyl iodide in 50 ml. of 1,2-dimethoxyethane over 3 hours. After additional stirring, the solution is concentrated *in vacuo*. The residue is refluxed in 100 ml. of a solution prepared from 30 g. of KOH, 30 ml. of water and 150 ml. of ethanol for 4 hours. Ethanol is removed *in vacuo* and the aqueous layer is extracted with 75 ml. of chloroform. The aqueous solution is acidified with 1N hydrochloric acid and extracted twice with 100 ml. of chloroform. The organic fraction is dried over anhydrous calcium chloride, filtered and concentrated *in vacuo*. Crystallization of the residue from hexane affords the product.

EXAMPLE 19

(α-Cyclopropyl-p-tolyl)cyclopropylacetic acid

A solution of 20 g. of (α-cyclopropyl-p-tolyl)acetic acid in 200 ml. of 1,2-dimethoxyethane is added to a stirred suspension of 2.5 g. of sodium hydride in 100 ml.

1,2-dimethoxyethane over 0.5 hour. The flask is cooled as necessary to maintain the temperature of the solution below 30°. This solution of the anion is cooled in an ice/water bath and vigorously stirred while a solution of 12.7 g. of cyclopropyl bromide in 100 ml. of 1,2-dimethoxyethane is added over 4 hours. Stirring is continued for 1 hour after the addition. The solution is concentrated to a minimum volume and poured into 100 ml. of a cold 40% sodium carbonate solution and extracted with ether. The aqueous fraction is carefully acidified with 1N HCl and extracted twice with 100 ml. of chloroform. The chloroform extracts are combined and dried over anhydrous calcium chloride. Removal of the desiccant and concentration in vacuo gives a solid material which can be crystallized from hexane to give the title compound.

EXAMPLE 20

2-(α-cyclopropyl-p-tolyl)-3-phenylacrylic acid

A mixture of 3.5 g. of (α-cyclopropyl-p-tolyl)acetic acid, 2.0 ml. of benzaldehyde and 2.5 ml. of triethylamine is cooled and 6.6 ml. of acetic anhydride added, the whole is stirred for ½ hour, then heated to 70° and then 100° over ½ hour and kept at this temperature for 6 hours. The mixture is diluted with 10 ml. of benzene and then extracted four times with 15 ml. of 10% sodium hydroxide solution. The combined extract is acidified with hydrochloric acid and the solid product collected and crystallized from ethanol.

EXAMPLE 21

2-(α-cyclopropyl-p-tolyl)-3-phenylpropionic acid

A solution of 3 g. of 2-(α-cyclopropyl-p-tolyl)-3-phenyl acrylic acid in 25 ml. of ethanol containing 0.1 g. of platinum oxide is hydrogenated at room temperature. After the calculated amount of hydrogen has been taken up, the reaction mixture is filtered and the solvent removed by evaporation and the residue crystallized from hexane.

EXAMPLE 22

[α-Cyclopropyl-p-(3-chloro)-tolyl]acetic acid

To a solution of 27 ml. (0.3 m.) of cyclopropanecarboxylic acid chloride and 35 ml. (35 g., 0.3 m.) of m-chlorotoluene dissolved in 200 ml. of carbon disulphide, 43 g. (0.32 m.) of anhydrous aluminum chloride is added portionwise while stirring and maintaining a temperature between 15–25°. Cooling and addition is regulated to maintain a vigorous reaction during the addition. The addition requires 20–30 minutes following which the reaction is allowed to proceed at room temperature for an additional hour and a half. The mixture is then poured into 600 g. of ice and diluted with 200 ml. of toluene. The organic layer is separated and washed four times with 25 ml. of water and then dried over anhydrous calcium chloride. The desiccant is removed and the solvent evaporated. The mixture of isomers is chromatographed using silica plates and the 3-chlorotolylcyclopropyl ketone separated by elution with methanol.

This isomer is brominated as in Example 1 using N-bromosuccinimide to form 3 - chloro-4-(cyclopropylcarbonyl)-benzyl bromide. This benzyl bromide is converted to the nitrile using the conditions shown in Example 2. The nitrile is hydrolyzed and reduced as in Examples 3 and 4 to give [α-cyclopropyl-p-(3 - chloro)-tolyl]acetic acid.

EXAMPLE 23

[α-Cyclopropyl-p-(3-methoxy)-tolyl]acetic acid

Employing the same sequence of reactions and conditions found in Example 22 but using m-methoxytoluene as starting material, α-cyclopropyl-p-(3-methoxy)-tolyl acetic acid is obtained.

EXAMPLE 24

[α-Cyclopropyl-p-(3-hydroxy)-tolyl]acetic acid

In the foregoing Example 23 by adding an additional quantity (15 g.) of anhydrous aluminum chloride to the reaction mixture at the end of the initial reaction, as noted by the cessation of the vigorous evolution of gas, and then heating the mixture under reflux for four hours, demethylation is effected and from the hydroxy ketone, following the remaining series of reactions detailed in Example 22, [α-cyclopropyl-p-(3 - hydroxy)-tolyl]acetic acid is obtained.

EXAMPLE 25

[α-Cyclopropyl-p-(3-trifluoromethyl)-tolyl]acetic acid

Using the foregoing sequence of reactions as in Example 22 but starting with m-trifluoromethyl toluene, [α-cyclopropyl-p-(3 - trifluoromethyl)-tolyl]acetic acid is obtained.

EXAMPLE 26

[α-Cyclopropyl-p-(3-acetoxy)-tolyl]acetic acid

A mixture of [α-cyclopropyl-p-(3-hydroxy)-tolyl]-acetic acid, prepared in Example 24, with an equivalent amount of acetyl chloride and triethylamine dissolved in a tenfold volume of benzene is heated on the steam bath for one half hour. The mixture is cooled, diluted with benzene and washed with water. After drying over anhydrous sodium sulfate, the solvent is evaporated and the product is crystallized from alcohol.

EXAMPLE 27

[α-Cyclopropyl-p-(3-tertiary butyl)-tolyl]acetic acid

Using the sequence of reactions found in Example 22 but starting with m-tertiary butyl toluene, [α-cyclopropyl-p-(3-tertiary butyl)-tolyl]acetic acid is obtained.

EXAMPLE 28

Ethyl p-cyclopropylcarbonylphenyl acetate

To a solution of 65 g. of ethyl phenylacetate and 74 g. of γ-chlorobutyryl chloride in 250 ml. of carbon disulfide cooled to 0°, while stirring, 120 g. of anhydrous aluminum chloride is added portionwise over 40 minutes. The temperature of the mixture is allowed to rise to 12° where evolution of hydrogen chloride is evident. The temperature is maintained between 12–20° for four hours or until the evolution of gas ceases. The reaction mixture is then poured into 1 kilogram of ice and 250 ml. of benzene. The benzene layer is removed and the aqueous layer extracted with an addition of 250 ml. of benzene. The combined benzene extract is washed four times with 50 ml. of portions of water, dried and the solvent evaporated. The reaction mixture, which by thin layer chromatography, shows the presence of two components, product and starting material, is dissolved in 150 ml. of methanol containing 34 g. of solid potassium hydroxide and the mixture shaken for ½ hour at room temperature. The insoluble material is filtered off and the filtrate concentrated in vacuo. The residue is taken up in 500 ml. of ether and this solution washed three times with 25 ml. of water and then dried and the solvent evaporated. The residue is dissolved in a small volume of ethanol and placed on a preparative column of silica gel, and using a solvent system of saturated methanol in hexane, the product is separated from the faster moving starting material present in the mixture. It is eluted from the column with methanol and obtained from the eluate on evaporation.

Saponification of this ester by heating with 2N sodium hydroxide followed by acidification gives p-cyclopropyl-carbonylphenylacetic acid, m.p. 110–112°.

EXAMPLE 29

Methyl (α-cyclopropyl-p-tolyl)acetate

To a solution of 5 g. of (α-cyclopropyl-p-tolyl)acetic acid in 150 ml. of ether, an ethereal solution of diazomethane is added until the yellow color of the latter persists. The excess diazomethane is destroyed by the addition of a small amount of glacial acetic acid. The solvent is removed *in vacuo* and the product is collected by vacuum distillation at 103°/0.25 mm.

EXAMPLE 30

2,4,5-trichlorophenyl (α-cyclopropyl-p-tolyl)acetate

To a solution of 3.5 g. of [α-cyclopropyl-p-tolyl] acetic acid in 30 ml. of ethyl acetate cooled in an ice/water mixture is added 4.1 g. of dicyclohexylcarbodiimide and 4.0 g. of 2,4,5-trichlorophenol in 10 ml. of ethyl acetate. The mixture is stirred for 0.5 hour in the ice bath and then for 1.5 hours at room temperature. Following the addition of 0.5 ml. of glacial acetic acid the insoluble precipitate is filtered off and washed with ethyl acetate. The combined filtrate and washings are concentrated under vacuum and the residue solidifies. This is crystallized from a small volume of warm ethanol containing a trace of acetic acid to give the product, 2,4,5-trichlorophenyl (α-cyclopropyl-p-tolyl) acetate.

EXAMPLE 31

(α-Cyclopropyl-p-tolyl)acetamide

Ammonia gas is bubbled into a solution of 5 g. of 2,4,5-trichlorophenyl-(α-cyclopropyl-p-tolyl)acetate in 25 ml. of methanol for 3 hours while the mixture is stirred and cooled in an ice/water bath. After standing overnight at 5° the solvent is evaporated *in vacuo* and the residue triturated with ether. The insoluble material is filtered off and crystallized from aqueous alcohol.

EXAMPLE 32

(α-Cyclopropyl-p-tolyl)-N-(2-diethylaminoethyl)acetamide

A solution of 5.7 g. of (α-cyclopropyl-p-tolyl) acetic acid in tetrahydrofuran containing 3.1 g. of methyl amine is treated with ethyl chloroformate (3.3 g.) at 0°, stirred for 30 minutes at 5° and then 5 g. of diethylaminoethylamine is added. The mixture is stirred for 3.5 hours at 5° and solvent is then removed by distillation. Water is added to the residue which is extracted with benzene. The benzene layer is washed with water, dried over a desiccant and the solvent evaporated. The residual oil crystallizes when treated with ether containing a little benzene. The product is then recrystallized from ethanol.

EXAMPLE 33

(α-Cyclopropyl-p-tolyl)acetic acid, hydrazide

A mixture of 0.6 g. (6 mm.) of methyl (α-cyclopropyl-p-tolyl) acetate and 1 ml. of anhydrous hydrazine hydrate (95%) dissolved in 10 ml. of methanol is allowed to stand overnight at room temperature. The product separates on standing. It is filtered off and washed with ether. It can be further purified by crystallization from hot methanol.

Using an alkyl substituted hydrazine in lieu of hydrazine one obtains alkyl substituted hydrazides.

EXAMPLE 34

Sodium (α-cyclopropyl-p-tolyl)acetate

To a solution of 19 g. (1 mole) of (α-cyclopropyl-p-tolyl)acetic acid in 150 ml. of ethanol, 4.5 g. of sodium hydroxide dissolved in 15 ml. of water is added at room temperature, while stirring. The solution is filtered and allowed to stand in the cold (5°) and the product separates. It is recrystallized from a small volume of boiling alcohol.

Other salts such as the potassium or magnesium salt are prepared using the above procedure by substituting the appropriate base for sodium hydroxide. Similarly, by using organic bases such as glucamine or triethylamine in lieu of sodium hydroxide, the salts of organic bases are obtained.

EXAMPLE 35

N-(α-cyclopropyl-p-tolyl)acetyl glycine

A solution of 0.4 g. of glycine in 5 ml. of water-dioxane (1:1) mixture is adjusted to pH 10.1 with 2N sodium hydroxide. With pH-stat control 2.0 g. of 2,4,5-trichlorophenyl (α-cyclopropyl-p-tolyl)acetate is added until the pH remains constant at 10 and the ninhydrin reaction is negative. The mixture is diluted with 10 ml. of water and extracted three times with 5.0 ml. portions of ethyl acetate. The aqueous layer is then adjusted to pH 3.5 with citric acid and extracted three times with 10 ml. portions of ethyl acetate. The combined ethyl acetate extract is washed with water, dried over magnesium sulfate and the solvent evaporated. This solid residue is purified by crystallization from ethyl acetate.

EXAMPLE 36

(α-Cyclopropyl-p-tolyl)acetyl urea

To 19 g. (0.1 m.) of (α-cyclopropyl-p-tolyl)acetic acid in 60 ml. of dry toluene, 7.5 ml. of thionyl chloride is added and the mixture heated on a steam bath for three hours. The excess solvents are removed *in vacuo* and the residue taken up in 50 ml. of anhydrous ether. This solution is added slowly with stirring to a suspension of 16 g. (0.11 m.) of silver cyanate in 25 ml. of dry ether. The mixture is stirred at room temperature for 48 hours and the supernate then decanted and the solid filtered and washed four times with 10 ml. of ether. The combined washings, filtrate and decantate are added with stirring at room temperature to a solution of 5.5 g. of ammonium carbonate in 80 ml. of water and 50 ml. of tetrahydrofuran. After five hours the ether and tetrahydrofuran are removed in vacuum and the product separates. It is washed with alcohol and then crystallized from boiling alcohol.

EXAMPLE 37

(α-Cyclopropyl-p-tolyl)acetaldehyde

To a solution of 10 g. of (α-cyclopropyl-p-tolyl)acetic acid in 150 ml. of dry benzene, cooled in an ice/water bath, is added over one hour a solution of 6.6 g. of oxalyl chloride in 50 ml. of benzene. The solution is concentrated *in vacuo* and redissolved in 100 ml. of ether. To this solution is added a solution of 2.26 g. of ethyleneimine in 50 ml. of ether containing one equivalent of triethylamine at 0°. The precipitated triethylamine hydrochloride is filtered off and washed with 100 ml. of ether. The combined ether solution of the N-acylaziridine is cooled to 0° and a solution of 0.5 g. of lithium aluminum hydride in 50 ml. of ether is added over 0.5 hour. After an additional hour cold 5N sulfuric acid is added, the ether layer is separated and the aqueous layer is extracted with 100 ml. of ether. The combined ether extracts are washed with 50 ml. of 5% sodium bicarbonate solution and 50 ml. of water and dried over anhydrous calcium chloride. Removal of desiccant, concentration *in vacuo* and vacuum distillation affords (α-cyclopropyl-p-tolyl)acetaldehyde.

EXAMPLE 38

(α-Cyclopropyl-p-tolyl)acetaldehyde, diethyl acetal

A solution of 10 g. of (α-cyclopropyl-p-tolyl)acetaldehyde and 0.25 g. of p-toluenesulfonic acid in 25 ml. of absolute ethanol and 150 ml. of benzene is refluxed for 4 hours followed by azeotropic distillation of the solvent over 6–8 hours. The residue is redissolved in benzene, neutralized with sodium acetate, filtered and concentrated *in vacuo*. The residue is vacuum distilled to obtain the product.

EXAMPLE 39

β-(α-Cyclopropyl-p-tolyl)ethanol

A solution of 19 g. (0.1 m.) (α-cyclopropyl-p-tolyl) acetic acid in 150 ml. of ether is slowly added to a stirred suspension of lithium aluminum hydride (3 molar excess) in 150 ml. of ether at room temperature. After addition is complete, stirring is maintained for one hour.

Excess hydride is decomposed with 95% ethanol, and the solids are filtered and thoroughly washed with ether. The combined filtrate and washings are concentrated *in vacuo* to give the title compound.

EXAMPLE 40

β-(α-Cyclopropyl-p-tolyl)ethanol

Using p-chlorophenyl cyclopropyl ketone as starting material p-chlorobenzyl cyclopropane is obtained by reduction as described in Example 4. This compound is converted to the Grignard reagent by conventional procedures and is then converted to α-cyclopropyl-p-tolyl-β-ethanol after treatment with ethylene oxide.

Similarly, compounds of formula I wherein $R_2$ and $R_3$ are hydrogen,

is keto or methylene and X is carbinol (—CH$_2$OH) can be prepared by reacting a Grignard reagent of the formula

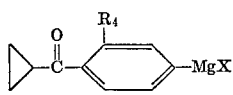

or its organo-lithium counterpart with ethylene oxide.

EXAMPLE 41

β-(α-Cyclopropyl-p-tolyl)ethyl chloride

To a solution of 10 g. of β-(α-cyclopropyl-p-tolyl) ethanol in 50 ml. of cold pyridine is added 10.8 g. of p-toluenesulfonyl chloride. The mixture is stirred until the acid chloride dissolves and is then allowed to stand for 15 hours at 5–10°. The resulting mixture is neutralized with 5% sodium bicarbonate solution, then 400 ml. of ethyl acetate is added. The organic layer is washed with 50 ml. of water and 50 ml. of saturated brine. The solution is dried (sodium sulfate) and concentrated *in vacuo*. The crude tosylate is dissolved in 50 ml. of dimethylformamide, and 2.64 g. of lithium chloride is added and the solution is stirred at room temperature for 10 hours. The mixture is then poured over 100 g. of ice and extracted twice with 150 ml. of ether. The ether extracts are combined and dried over anhydrous calcium chloride. Removal of desiccant and concentration *in vacuo* gives a residue which is crystallized from hexane.

EXAMPLE 42

β-(α-Cyclopropyl-p-tolyl)ethanol, methyl ether

To a solution of 5 g. of β-(α-cyclopropyl-p-tolyl) ethanol in 50 ml. of 95% ethanol is added 5.3 g. of dimethyl sulfate at 25–30° over 1 hour. A 1N sodium hydroxide solution is added as needed to maintain alkalinity. Stirring is continued for 1 hour and ethanol is removed *in vacuo*. The mixture is acidified with 1N HCl and extracted twice with 50 ml. of ether. The ether extracts are dried over anhydrous calcium chloride, filtered and concentrated *in vacuo*. The residue is vacuum distilled to afford the product.

EXAMPLE 43

β-(α-Cyclopropyl-p-tolyl)ethanol, acetate

To a solution of 10 g. of β-(α-cyclopropyl-p-tolyl) ethanol in 50 ml. of pyridine is added 25 ml. of acetic anhydride. The mixture is allowed to stand at room temperature for 24 hours. The solution is concentrated *in vacuo*, the residue redissolved in ether and washed with 50 ml. of 5% sodium bicarbonate and 50 ml. of water. The ether solution is dried over anhydrous calcium chloride, filtered and concentrated *in vacuo*. The residue is vacuum distilled to give the product.

EXAMPLE 44

β-(α-Cyclopropyl-p-tolyl)ethyl carbamate

To a stirred solution of 0.1 m. (17.5 g.) of β-(α-cyclopropyl-p-tolyl)ethanol, as prepared in Example 39, in 40 ml. pyridine, cooled in an ice/water bath, 15.6 g. of phenylchloroformate is added slowly. After addition the mixture is stirred for three hours at room temperature and then decomposed by the addition of 100 ml. of water. The mixture is extracted several times with ether and the combined extract washed successively twice with 100 ml. 1:1 hydrochloric acid, 100 ml. saturated sodium bicarbonate and 100 ml. saturated sodium chloride solution. The ether extract is then dried and concentrated to a volume of 200 ml. This ether solution is added with stirring to an equal volume of liquid ammonia and stirred with cooling at reflux temperature for 5 hours and then allowed to evaporate at room temperature. The product separates from the ethereal solution after the ammonia evaporates. It is purified by crystallization from petroleum ether.

EXAMPLES 45 TO 52

By reacting the arylcyclopropyl-ketone shown in the left-hand column of Table 1 with a halogenating substance employing the procedure of Example 1, a p-cyclopropylcarbonylbenzylhalide is formed as shown in the middle column of Table I. By reacting the p-cyclopropylcarbonylbenzyl halide with a cyanide as described in Example 2, the corresponding p-cyclopropylcarbonylphenylacetonitrile is formed.

By hydrolyzing the acetonitrile in accordance with the procedure described in Example 3, the corresponding p-cyclopropylcarbonylphenylacetic acid is formed. By reducing the p-cyclopropylcarbonylphenylacetic acid employing the procedure described in Example 4, the product shown in the right-hand column of Table I is obtained.

TABLE I

| Example number | R₄ | R₂ | R₃ | R₄ | R₂ | R₃ | Hal | R₄ | R₂ | R₃ |
|---|---|---|---|---|---|---|---|---|---|---|
| 45 | H | CH₃ | CH₃ | As in 1st column | | | Br | As in 1st column | | |
| 46 | —CF₃ | C₃H₇ | H | As in 1st column | | | Cl | As in 1st column | | |
| 47 | t-C₄H₉ | C₄H₉ | C₄H₉ | As in 1st column | | | Br | As in 1st column | | |
| 48 | —OH | C₅H₁₁ | CH₃ | As in 1st column | | | Br | As in 1st column | | |
| 49 | —OH | ⟨S⟩— | CH₃ | As in 1st column | | | Cl | As in 1st column | | |
| 50 | —OC₃H₇ | CH₃ | CH₃ | As in 1st column | | | Br | As in 1st column | | |
| 51 | —O—C(=O)—CH₃ | C₂H₅ | H | As in 1st column | | | Cl | As in 1st column | | |
| 52 | Cl | ⟨phenyl⟩—CH₂— | H | As in 1st column | | | Br | As in 1st column | | |

EXAMPLES 53 TO 57

By reacting a γ-chloro-butyryl chloride with the phenyl compound shown in the left-hand portion of Table II employing a Friedel-Crafts acylation as described in Example 28, a tolyl ketone is formed as shown in the middle column of Table II. By reacting the tolyl ketone with a base as described in Example 44, the p-cyclopropyl tolyl ketone of Formula II is formed, as shown in the right-hand column of Table II, which compound is employed as a starting material in the preparation of the compounds of the invention.

TABLE II

| Example number | R₄ | R₂ | R₃ | R₄ | R₂ | R₃ | R₄ | R₂ | R₃ |
|---|---|---|---|---|---|---|---|---|---|
| 53 | CF₃ | CH₃ | CH₃ | As in first column | | | As in first column | | |
| 54 | C₂H₅ | ⟨S⟩— | CH₃ | As in first column | | | As in first column | | |
| 55 | Cl | H | H | As in first column | | | As in first column | | |
| 56 | C₂H₅O— | C₄H₉— | C₄H₉— | As in first column | | | As in first column | | |
| 57 | CH₃—C(=O)—O— | C₆H₁₃ | C₆H₁₃ | As in first column | | | As in first column | | |

EXAMPLE 58

Methyl p-cyclopropylcarbonylphenylacetate

To 10 g. of p-cyclopropylcarbonylphenylacetic acid in 200 ml. of ether is added, with stirring, an excess of diazomethane. The solution is allowed to stand overnight, filtered and concentrated. The residual oil is distilled at 135°/0.5 mm. Hg to give the title compound.

EXAMPLE 59

Methyl 2-(p-cyclopropylcarbonylphenyl)propionate

To a stirred suspension of 2.5 g. of sodium amide in 300 ml. of ammonia is added 10 g. of the Example 58 product in 10 ml. of ether. After 15 minutes, 11.6 g. of methyl iodide in 10 ml. of ether is added and the solution is allowed to stir and reflux for one hour. The ammonia is evaporated and the residue distributed between water and ether. The organic phase is washed with saturated sodium bicarbonate solution, saturated brine solution and water, dried and evaporated to give the title compound.

EXAMPLE 60

2-(p-cyclopropylcarbonylphenyl)propionic acid

To a solution prepared from 3.0 g. of KOH, 5 ml. of water and 20 ml. of ethanol is added 10 g. of the Example 59 product. The mixture is refluxed for three hours, concentrated and the residue dissolved in water and washed with chloroform. The aqueous fraction is acidified and extracted with ether. The organic fractions are washed with water, dried and evaporated. Crystallization of the residue from hexane gives the title compound, m.p. 91.5–93°.

EXAMPLE 61

2-(p-cyclopropylmethylphenyl)propionic acid

A solution prepared from 5.0 g. of hydrazine hydrate and 5.0 g. of the Example 60 product is refluxed for one hour. Solid potassium hydroxide (5.0 g.) is added and the mixture is stirred and heated until gas evolution ceases. Excess hydrazine hydrate is removed by distillation, and the residue dissolved in water and washed with chloroform. The aqueous fraction is acidified and extracted with ether. The organic fractions are washed with water and evaporated. Chromatography of the residue on silica gel and elution with benzene affords the title compound, b.p. 125°/0.05 mm. Hg.

What is claimed is:

1. A compound of the formula

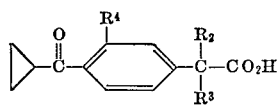

wherein R₂ and R₃ are selected from the group consisting of hydrogen and lower alkyl and R₄ is selected from the group consisting of hydrogen, hydroxy, lower alkyl, lower alkoxy, lower alkanoyloxy, halogen and trifluoromethyl; and pharmaceutically acceptable salts thereof.

2. A compound of the formula:

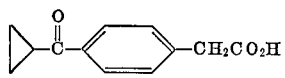

3. A compound in accordance with claim 1 wherein $R_2$, $R_3$ and $R_4$ are hydrogen, and salts thereof.

4. A compound in accordance with claim 1 wherein one of $R_2$ and $R_3$ is methyl and the other is hydrogen, $R_4$ is hydrogen, and salts thereof.

5. A compound in accordance with claim 1 wherein $R_2$ and $R_3$ are each methyl, $R_4$ is hydrogen, and salts thereof.

References Cited

Bays et al.: S. Afr. Patent Jour. (February 1969), pp. 186-7; Abstract of S. Afr. Pat. No. 68/4,682 (Jan. 1, 1959), not presently available.

JAMES A. PATTEN, Primary Examiner

U.S. Cl. X.R.

204—158 HE; 260—243 B, 247, 247.2 R, 247.5 R, 247.7 R, 247.7 A 247.7 K, 268 R, 293.72, 293.75, 293.78, 293.8, 293.81, 326.5 R, 326.5 J, 326.5 L, 326.5 M, 326.62, 326.83, 326.85, 465 R, 465 D, 465 E, 465 F, 465 G, 469, 471 A, 471 C, 473 A, 479 R, 482 C, 488 CD, 501.1, 501.16, 515 A, 518 R, 520, 553 A, 558 R, 558 H, 559 H, 566 AE, 570.5 CA, 590, 591, 592, 599, 611 A, 612 R, 618 R, 618 D, 619 D, 649 R; 424—246, 248, 250, 267, 274, 286, 300, 308, 309, 311, 316, 317, 319, 320, 322, 325, 330, 340, 346, 353

UNITED STATES PATENT OFFICE
CERTIFICATE OF CORRECTION

PATENT NO. : 3,839,431
DATED : October 1, 1974
INVENTOR(S) : John T. Sheehan et al.

It is certified that error appears in the above-identified patent and that said Letters Patent are hereby corrected as shown below:

Col. 2, line 5, a period should be inserted after the formula.

Col. 2, line 25, at the end of the line, a semicolon should be inserted after the formula.

Col. 2, line 36, "2,24-" should read -- 2,2,4- --.

Col. 7, formula VII, "$\underset{-C-}{\overset{|}{R_1}}$" should read $\underset{-C-}{\overset{\|}{R_1}}$ --.

Col. 9, line 35, "$\underset{-C-}{\overset{\|}{R}}$" should read $\underset{-C-}{\overset{\|}{R_1}}$ --.

Col. 10, formula XVII, "COOH" should read --C-COOH--.

Col. 10, line 64, in the formula, "NH" should read --HN--.

Col. 21, line 73, the comma after "in vacuo" should be deleted and a period should be inserted in its place.

Signed and sealed this 10th day of June 1975.

(SEAL)
Attest:

RUTH C. MASON
Attesting Officer

C. MARSHALL DANN
Commissioner of Patents
and Trademarks